US012807076B2

(12) United States Patent
Farias Delgado et al.

(10) Patent No.: US 12,807,076 B2
(45) Date of Patent: Nov. 24, 2026

(54) CROSS BAR MOUNT

(71) Applicant: Ford Global Technologies, LLC, Dearborn, MI (US)

(72) Inventors: Enrique Emanuel Farias Delgado, Cuautitlan Izcalli (MX); Mario Contreras Sosa, Naucalpan (MX)

(73) Assignee: Ford Global Technologies, LLC, Dearborn, MI (US)

( * ) Notice: Subject to any disclaimer, the term of this patent is extended or adjusted under 35 U.S.C. 154(b) by 351 days.

(21) Appl. No.: 18/415,769

(22) Filed: Jan. 18, 2024

(65) Prior Publication Data

US 2025/0236241 A1 Jul. 24, 2025

(51) Int. Cl.

*B60R 9/058* (2006.01)
*B62D 25/06* (2006.01)

(52) U.S. Cl.

CPC .............. *B60R 9/058* (2013.01); *B62D 25/06* (2013.01)

(58) Field of Classification Search

CPC ........... B60R 9/04; B60R 9/058; B60R 9/042; B62D 25/06
USPC ........................................................... 296/215
See application file for complete search history.

(56) References Cited

U.S. PATENT DOCUMENTS

| | | | | |
|---|---|---|---|---|
| 5,636,776 | A * | 6/1997 | Rak | B60R 9/045 224/325 |
| 10,449,909 | B2 | 10/2019 | Connolly et al. | |
| 2019/0061635 | A1 * | 2/2019 | Connolly | B60R 9/058 |
| 2023/0044002 | A1 * | 2/2023 | McMillan | B60R 21/235 |
| 2023/0150437 | A1 | 5/2023 | Bernal et al. | |

FOREIGN PATENT DOCUMENTS

| | | | |
|---|---|---|---|
| CN | 218907095 | U | 4/2023 |
| EP | 4261085 | A1 | 10/2023 |
| WO | 2023198514 | A1 | 10/2023 |

* cited by examiner

*Primary Examiner* — Caroline N Butcher
(74) *Attorney, Agent, or Firm* — Vichit Chea; Carlson, Gaskey & Olds, P.C.

(57) ABSTRACT

An attachment structure includes a vehicle body structure, a bracket body securable to the vehicle body structure and having an interior facing side and an exterior facing side, and at least one aperture extending through a thickness of the bracket body from the interior facing side to the exterior facing side. At least one insert is received within the at least one aperture. The at least one insert extends from a head portion on the exterior facing side to a tail portion on the interior facing side. At least one attachment member is securable to the tail portion to attach the bracket body to the vehicle body structure.

20 Claims, 4 Drawing Sheets

CROSS BAR MOUNT

TECHNICAL FIELD

This disclosure relates generally to an attachment structure that secures a cross bar to a vehicle body structure along opposing edges of a glass panel.

BACKGROUND

Vehicles transport various types of cargo. A cross bar can be attached to a vehicle to support larger items, e.g. travel storage boxes, kayaks, bikes, etc., for transportation purposes. Vehicles can also include glass panels that extend over a significant portion of a top of the vehicle. Providing for quick and secure mounting of cross bars relative to such panels can be challenging.

SUMMARY

An attachment structure according to an exemplary aspect of the present disclosure includes, among other things: a vehicle body structure; a bracket body securable to the vehicle body structure and having an interior facing side and an exterior facing side; at least one aperture extending through a thickness of the bracket body from the interior facing side to the exterior facing side; at least one insert received within the at least one aperture, wherein the at least one insert extends from a head portion on the exterior facing side to a tail portion on the interior facing side; and at least one attachment member securable to the tail portion to attach the bracket body to the vehicle body structure.

In a further non-limiting embodiment of the foregoing attachment structure, the at least one attachment member comprises a nut.

In a further non-limiting embodiment of any of the foregoing attachment structures, the at least one aperture comprises a first aperture and a second aperture, and wherein the at least one insert comprises a first insert received in the first aperture and a second insert received within the second aperture, and wherein the at least one attachment member comprises a first attachment member secured to the tail portion of the first insert and a second attachment member secured to the tail portion of the second insert.

In a further non-limiting embodiment of any of the foregoing attachment structures, the bracket body includes a recessed area spaced inward from the exterior facing side, wherein the at least one aperture is located within the recessed area.

In a further non-limiting embodiment of any of the foregoing attachment structures, a cover encloses the recessed area, wherein the cover is selectively removable to access the at least one insert.

In a further non-limiting embodiment of any of the foregoing attachment structures, the at least one insert comprises an internal passage open to both the head portion and the tail portion, and wherein the internal passage is configured to receive a fastener to secure a cross bar body to the vehicle body structure.

In a further non-limiting embodiment of any of the foregoing attachment structures, the vehicle body structure extends along one edge of a glass panel, and wherein the one edge of the glass panel includes an open notched area within which the bracket body is located, and wherein the vehicle body structure has at least one opening aligned with the at least one aperture, and wherein the tail portion is inserted through the at least one opening to secure the bracket body to the vehicle body structure within the open notched area.

An assembly according to an exemplary aspect of the present disclosure includes, among other things: a vehicle body structure; a glass panel supported by the vehicle body structure; a first attachment structure positioned adjacent one edge of the glass panel; a second attachment structure positioned adjacent an opposite edge of the glass panel; and wherein the first attachment structure and the second attachment structure each comprise: a bracket body having an interior facing side and an exterior facing side; at least one aperture extending through a thickness of the bracket body from the interior facing side to the exterior facing side; at least one insert received within the at least one aperture, wherein the at least one insert extends from a head portion on the exterior facing side to a tail portion on the interior facing side, and wherein the at least one insert comprises an internal passage open to both the head portion and the tail portion, wherein the internal passage is configured to receive a fastener; a vehicle body structure having at least one opening aligned with the at least one aperture, wherein the tail portion is inserted through the at least one opening; and at least one attachment member securable to the tail portion to attach the bracket body to the vehicle body structure.

In a further non-limiting embodiment of the foregoing assembly, the at least one aperture comprises a first aperture and a second aperture, and wherein the at least one insert comprises a first insert received in the first aperture and a second insert received within the second aperture, and wherein the at least one attachment member comprises a first attachment member secured to the tail portion of the first insert and a second attachment member secured to the tail portion of the second insert.

In a further non-limiting embodiment of any of the foregoing assemblies, the first aperture and the second aperture are the only apertures in the bracket body.

In a further non-limiting embodiment of any of the foregoing assemblies, the first attachment member and the second attachment member each comprise a nut.

In a further non-limiting embodiment of any of the foregoing assemblies, the bracket body includes a recessed area spaced inward from the exterior facing side, wherein the first aperture and second aperture are located within the recessed area.

In a further non-limiting embodiment of any of the foregoing assemblies, a cover encloses the recessed area, wherein the cover is selectively removable to access the first insert and the second insert.

In a further non-limiting embodiment of any of the foregoing assemblies, the internal passage comprises a threaded surface and wherein the fastener comprises a first fastener that is threaded into the internal passage of the first insert and a second fastener that is threaded into the internal passage of the second insert to secure a cross bar body to the vehicle body structure.

In a further non-limiting embodiment of any of the foregoing assemblies, each edge of the glass panel includes an open notched area within which the bracket body is located.

In a further non-limiting embodiment of any of the foregoing assemblies, a cross bar body extends over the glass panel between a first end attached to the first attachment structure and a second end attached to the second attachment structure.

In a further non-limiting embodiment of any of the foregoing assemblies, a seal is positioned between an outer periphery of the bracket body and the vehicle body structure at each of the first attachment structure and the second attachment structure.

A method according to another exemplary aspect of the present disclosure includes, among other things: providing a bracket body with a first aperture and a second aperture, wherein the bracket body has an interior facing side and an exterior facing side; installing a first insert in the first aperture and a second insert in the second aperture, wherein each of the first insert and the second insert extends from a head portion on the exterior facing side to a tail portion on the interior facing side, and wherein each of the first insert and the second insert comprises an internal passage open to both the head portion and the tail portion; and securing a first attachment member to the tail portion of the first insert and a second attachment member to the tail portion of the second insert to fix the bracket body to a vehicle body structure along one edge of a glass panel.

In a further non-limiting embodiment of the foregoing method, the bracket body comprises a first bracket body, and the method includes: fixing the first bracket body to the vehicle body structure along the one edge of a glass panel; fixing a second bracket body to the vehicle body structure along an opposite edge of the glass panel; attaching one end of cross bar body to the first bracket body; and attaching an opposite end of the cross bar body to the second bracket body.

In a further non-limiting embodiment of any of the foregoing methods, the method includes: installing a cover over the first aperture and the second aperture; selectively removing the cover to access the first aperture and second aperture; and installing a first fastener in the internal passage of the first insert and installing a second fastener in the internal passage of the second insert when the cover is removed to secure a cross bar body to the vehicle body structure.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details an attachment structure for attaching a cross bar to a vehicle body structure along opposing edges of a glass panel, wherein the attachment structure comprises a bracket assembly with unified inserts for fasteners.

Figure 1A:
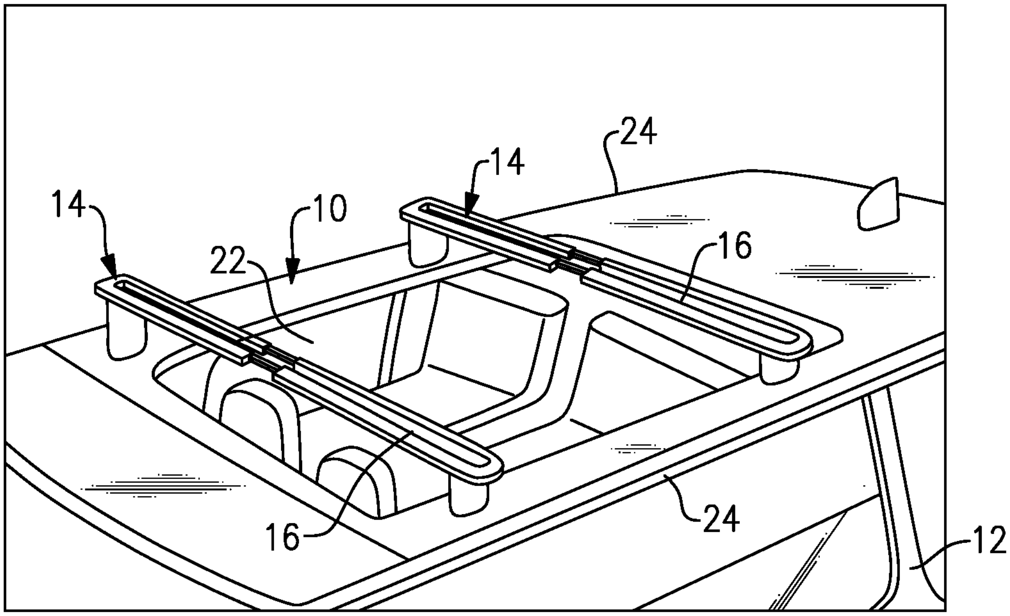
FIG. 1A illustrates a perspective view of a top of a vehicle that comprises a glass panel, and which includes cross bars.
Figure 1B:
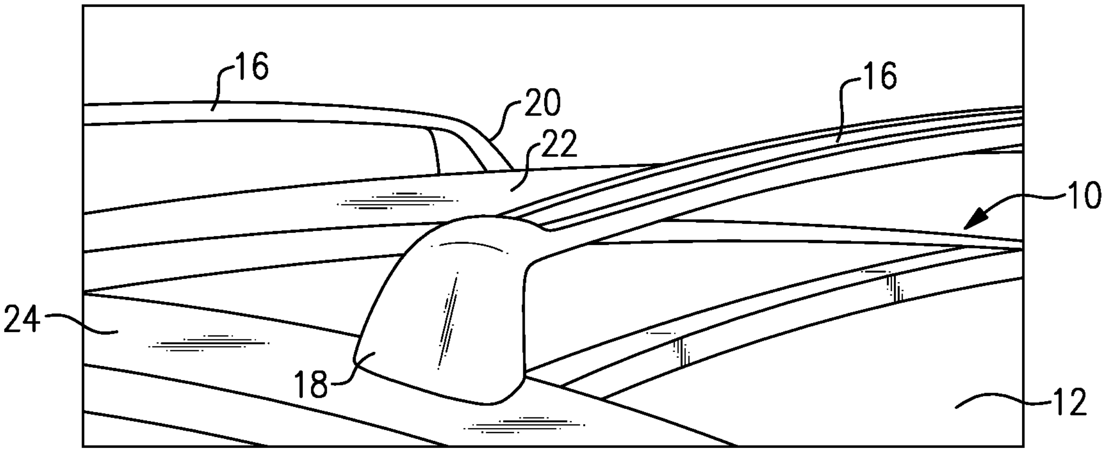
FIG. 1B is a magnified view of one end of a cross bar body as attached to a vehicle body structure.

With reference to FIG. 1, a top 10 of a vehicle 12 is shown which includes one or more cross bars 14 extending over the top 10 of the vehicle 12. Each cross bar 14 comprises an elongated cross bar body 16 that extends between a first end 18 and a second end 20. The cross bar bodies 16 are supported relative to a glass panel 22 that comprises a significant portion of the top 10 of the vehicle 12.

A vehicle body structure 24 extends about a periphery of the glass panel 22. In one example, the vehicle body structure 24 comprises a rigid frame or rail member that is used to support the glass panel 22. The subject disclosure provides an attachment structure 26 (FIG. 2) that is used to attach each of the first end 18 and the second end 20 of the cross bar body 16 to the vehicle body structure 24. As such, there is a first attachment structure 26 positioned adjacent one edge of the glass panel 22 and a second attachment structure 26 positioned adjacent an opposite edge of the glass panel 22.

Figure 2:
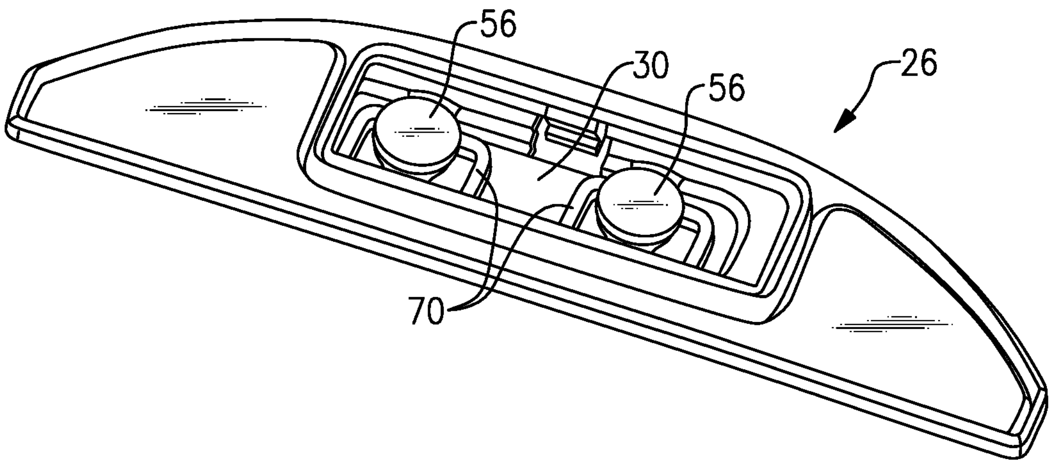
FIG. 2 is a perspective top view of an attachment structure used to attach each end of the cross bar body to the vehicle body structure.
Figure 3:
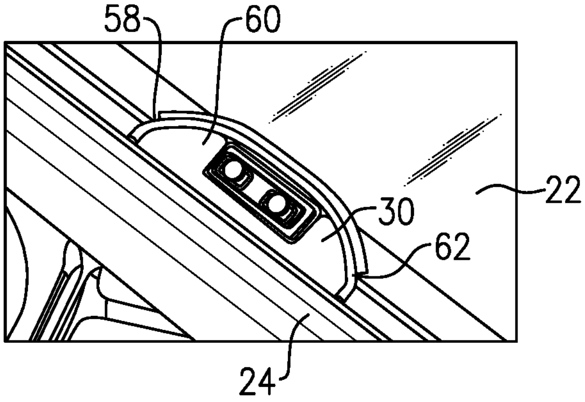
FIG. 3 is a perspective bottom view of the attachment structure as attached to the vehicle body structure.

Each attachment structure 26 comprises a bracket body 30 having an exterior facing side 32 (FIG. 2) and an interior facing side 34 (FIG. 3). In one example, the bracket body 30 comprises die cast bracket with one or more attachment points for each end of the cross bar body, wherein the attachment structure is capable of withstanding 100-150 pounds of load. Additionally, all of the load passes through the bracket bodies and none of the load is transferred to the glass panel. Further, a unified attachment strategy is provided where pre-installed inserts in the bracket body accept common fasteners at each end.

In one example, the bracket body 30 includes one or more apertures 36 that extend through a thickness of the bracket body 30 from the interior facing side 34 to the exterior facing side 32. In the example shown, there are only two apertures 36 per each bracket body 30. An insert 38 is received within each aperture 36 and an attachment member 40 is secured to each insert 38. Thus, in the example shown in FIGS. 3-5, there is a first aperture 36*a* that receives a first insert 38*a* and a second aperture 36*b* that receives a second insert 38*b*. A first attachment member 40*a* is secured to the first insert 38*a* and a second attachment member 40*b* is secured to the second insert 38*b*.

Figure 5:
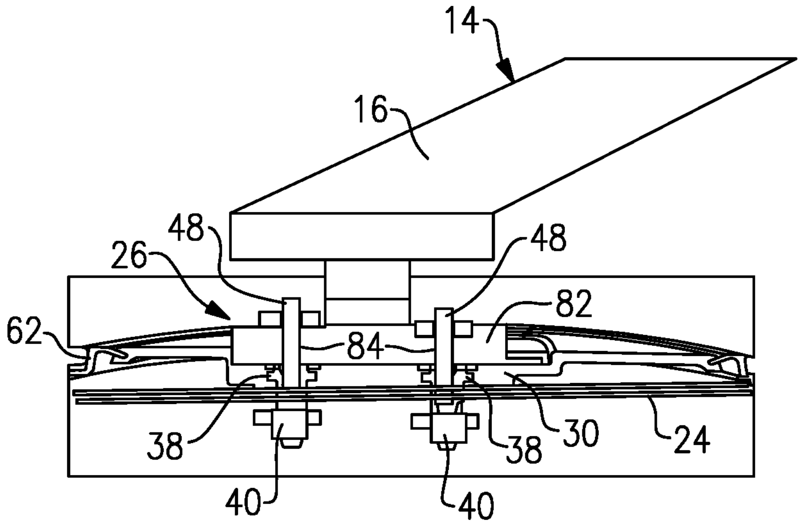
FIG. 5 is a view similar to FIG. 4 but also showing one end of the cross bar body attached to the attachment structure.

In one example, each insert 38 extends from a head portion 42 on the exterior facing side 32 to a tail portion 44 on the interior facing side 34. Each insert 38 further comprises an internal passage 46 that is open to both the head portion 42 and the tail portion 44. In one example, the inserts 38 are comprised of a stainless steel material. In one example, the internal passage 46 is configured to receive a fastener 48 (FIG. 5). In one example, the internal passage 46 is a threaded passage and the fastener 48 comprises a threaded fastener.

The vehicle body structure 24 has openings 50 that are aligned with the apertures 36. In one example, the tail portions 44 are inserted through the respective openings 50 and the attachment members 40 are secured to the tail portions 44 to attach the bracket body 30 to the vehicle body structure 24. In one example, the first attachment member 40 and the second attachment member 40 each comprise a nut. Thus, the attachment members 40 are only accessible from within the vehicle interior, which prevents outsiders from detaching the brackets.

In one example, the bracket bodies 30 include a recessed area 52 spaced inward from the exterior facing side 32. The recessed area 52 comprises a flat, planar surface that is generally spaced apart and parallel to a flat, planar surface of the exterior facing side 32. In one example, the first and second apertures 36 are located within the recessed area 52.

A cover 54 may be used to enclose the recessed area 52. Additionally, caps 56 (FIG. 2) can be placed over the inserts 38 to cover the open internals passages 46. The cover 54 and the caps 56 are selectively removable to access the first and second inserts 38.

Figure 4:
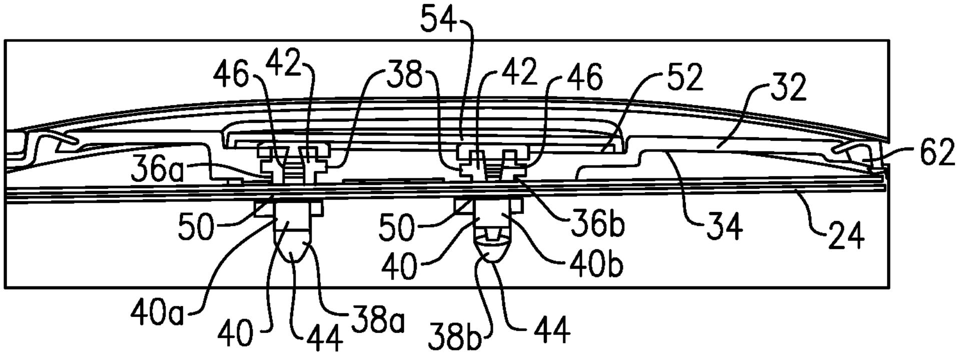
FIG. 4 is a section view of the attachment structure of FIG. 3.

In one example, each edge of the glass panel 22 includes an open notched area 58 within which the bracket body 30 is located as shown in FIG. 3. In one example, the bracket body 30 has an outer periphery 60 that is contoured to match the profile of the open notched area 58 as shown in FIG. 2. Further, FIGS. 3-5 show a configuration where a seal 62 is positioned between the outer periphery 60 of the bracket body 30 and the vehicle body structure 24 at each of the attachment structures 26. The cross bar body 16 extends over the glass panel 22 with the first end 18 being attached to the first attachment structure 26 and the second end 20 being attached to the second attachment structure 26.

Figure 6A:
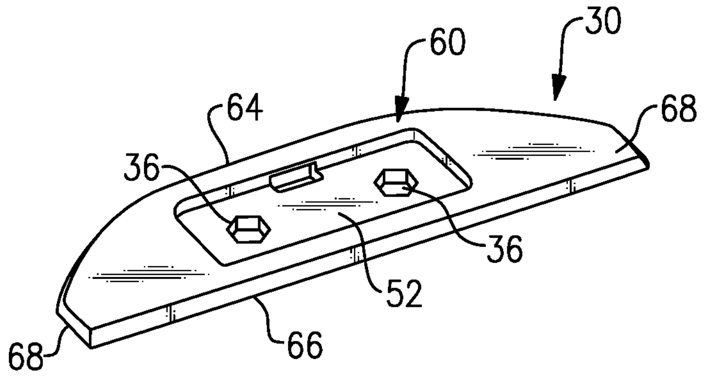
FIG. 6A is a perspective view of a bracket body of the attachment structure.

FIG. 6A is a perspective view of a bracket body of the attachment structure. As discussed above, the bracket body 30 has an outer periphery 60 that is contoured to match the profile of the open notched area 58 in the glass panel 22. In one example, the contour comprises a curved portion 64 on one side, a straight portion 66 on an opposite side, and a pair of short, straight edges 68 that extend between the curved portion 64 and the straight portion 66. The recessed area 52 is generally located in a central portion of the bracket body 30 on the exterior facing side 32.

Figure 6B:
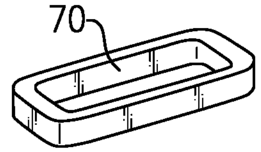
FIG. 6B is a perspective view of a lid seal that fits in a recessed area of the bracket body.
Figure 6C:
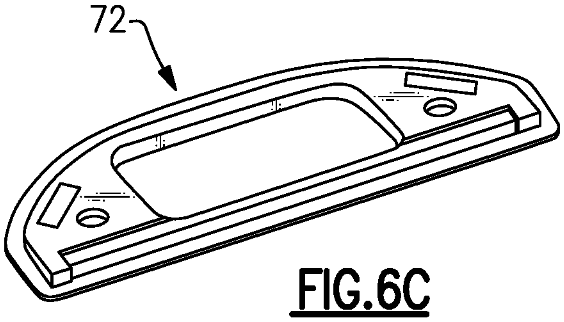
FIG. 6C is a perspective view of a covering that fits over the bracket body.

FIG. 6B shows a lid seal 70 that fits in the recessed area 52 of the bracket body 30 around each aperture 36. FIG. 6C shows a covering 72 that fits over the bracket body 30 and lid seal 70.

Figure 6D:
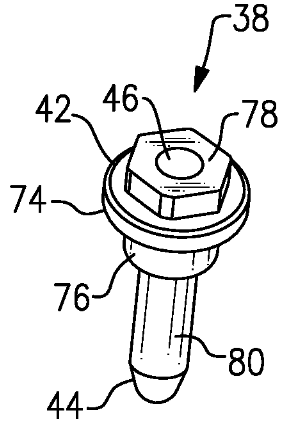
FIG. 6D is a perspective view of the inserts.

FIG. 6D is a perspective view of the inserts 38. In one example, the head portion 42 comprises a maximum outermost dimension of the insert 38 and the tail portion 44 comprises a minimum outermost dimension. In one example, the head portion 42 comprises a flange portion 74 that has the maximum outermost dimension, a collar portion 76 just below the flange portion 74, and a polygonal portion 78 just above the flange portion 74. The collar portion 76 transitions into a main body portion 80 of the insert 38, which then transitions into the tail portion 44

Figure 6E:
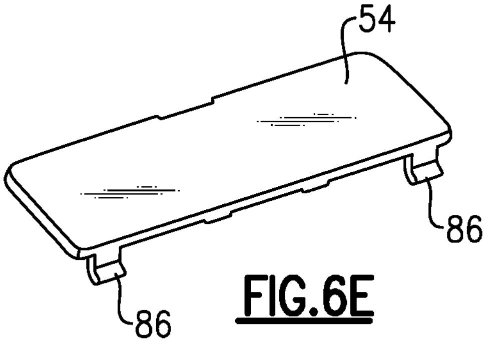
FIG. 6E is a perspective view of a cover that encloses the recessed area.

FIG. 6E is a perspective view of the cover 54 that encloses the recessed area 52. Resilient clips or tabs 86 can be used to secure the cover 54 in place. As discussed above, the cover 54 is selectively removable to access the inserts 38, such that fasteners 48 can be installed through an end body portion 82 (FIG. 5) of the cross bar body 16. The end body portion 82 includes comprises a flange with openings 84 that are aligned with the internal passages 46 of the inserts 38 such that the fasteners 48 can be installed to secure the end body portion 82 to the bracket body 30.

The subject disclosure provides for a cross bar mount structure that has an aesthetically pleasing appearance in glass panel configurations, and which is also easy to install and does not pass loading through the panel. Further, the cross bar mount structure provides a sealed interface such that there is no water enter into the vehicle.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. An attachment structure comprising:
- a vehicle body structure;
- a bracket body securable to the vehicle body structure and having an interior facing side and an exterior facing side;
- at least one aperture extending through a thickness of the bracket body from the interior facing side to the exterior facing side;
- at least one insert received within the at least one aperture, wherein the at least one insert extends from a head portion on the exterior facing side to a tail portion on the interior facing side;
- at least one attachment member securable to the tail portion to attach the bracket body to the vehicle body structure; and
- a fastener receivable within the at least one insert to secure a cross bar body to the vehicle body structure.

2. The attachment structure of claim 1, wherein the at least one attachment member comprises a nut.

3. The attachment structure of claim 1, wherein the at least one aperture comprises a first aperture and a second aperture, and wherein the at least one insert comprises a first insert received in the first aperture and a second insert received within the second aperture, and wherein the at least one attachment member comprises a first attachment member secured to the tail portion of the first insert and a second attachment member secured to the tail portion of the second insert.

4. The attachment structure of claim 1, wherein the bracket body includes a recessed area spaced inward from the exterior facing side, wherein the at least one aperture is located within the recessed area.

5. An attachment structure comprising:
- a vehicle body structure;
  - a bracket body securable to the vehicle body structure and having an interior facing side and an exterior facing side;
  - at least one aperture extending through a thickness of the bracket body from the interior facing side to the exterior facing side, wherein the bracket body includes a recessed area spaced inward from the exterior facing side, and wherein the at least one aperture is located within the recessed area;
  - at least one insert received within the at least one aperture, wherein the at least one insert extends from a head portion on the exterior facing side to a tail portion on the interior facing side; at least one attachment member securable to the tail portion to attach the bracket body to the vehicle body structure; and
  - a cover enclosing the recessed area, wherein the cover is selectively removable to access the at least one insert.

6. The attachment structure of claim 1, wherein the at least one insert comprises an internal passage open to both the head portion and the tail portion, and wherein the internal passage is configured to receive the fastener to secure the cross bar body to the vehicle body structure.

7. The attachment structure of claim 1, wherein the vehicle body structure extends along one edge of a glass panel, and wherein the one edge of the glass panel includes an open notched area within which the bracket body is located, and wherein the vehicle body structure has at least one opening aligned with the at least one aperture, and wherein the tail portion is inserted through the at least one opening to secure the bracket body to the vehicle body structure within the open notched area.

8. An assembly comprising:

a vehicle body structure;

a glass panel supported by the vehicle body structure;

a first attachment structure positioned adjacent one edge of the glass panel;

a second attachment structure positioned adjacent an opposite edge of the glass panel; and wherein the first attachment structure and the second attachment structure each comprise:

a bracket body having an interior facing side and an exterior facing side;

at least one aperture extending through a thickness of the bracket body from the interior facing side to the exterior facing side;

at least one insert received within the at least one aperture, wherein the at least one insert extends from a head portion on the exterior facing side to a tail portion on the interior facing side, and wherein the at least one insert comprises an internal passage open to both the head portion and the tail portion, wherein the internal passage is configured to receive a fastener;

a vehicle body structure having at least one opening aligned with the at least one aperture, wherein the tail portion is inserted through the at least one opening;

at least one attachment member securable to the tail portion to attach the bracket body to the vehicle body structure; and the fastener is receivable within the internal passage of the at least one insert to secure a cross bar body to the vehicle body structure.

9. The assembly of claim 8, wherein the at least one aperture comprises a first aperture and a second aperture, and wherein the at least one insert comprises a first insert received in the first aperture and a second insert received within the second aperture, and wherein the at least one attachment member comprises a first attachment member secured to the tail portion of the first insert and a second attachment member secured to the tail portion of the second insert.

10. The assembly of claim 9, wherein the first aperture and the second aperture are the only apertures in the bracket body.

11. The assembly of claim 9, wherein the first attachment member and the second attachment member each comprise a nut.

12. The assembly of claim 9, wherein the bracket body includes a recessed area spaced inward from the exterior facing side, wherein the first aperture and second aperture are located within the recessed area.

13. The assembly of claim 9, wherein the internal passage comprises a threaded surface and wherein the fastener comprises a first fastener that is threaded into the internal passage of the first insert and a second fastener that is threaded into the internal passage of the second insert to secure the cross bar body to the vehicle body structure.

14. The assembly of claim 9, wherein each edge of the glass panel includes an open notched area within which the bracket body is located.

15. The assembly of claim 14, including a cross bar body extending over the glass panel between a first end attached to the first attachment structure and a second end attached to the second attachment structure.

16. The assembly of claim 14, including a seal positioned between an outer periphery of the bracket body and the vehicle body structure at each of the first attachment structure and the second attachment structure.

17. An assembly comprising:

a vehicle body structure;

a glass panel supported by the vehicle body structure;

a first attachment structure positioned adjacent one edge of the glass panel;

a second attachment structure positioned adjacent an opposite edge of the glass panel; and wherein the first attachment structure and the second attachment structure each comprise:

a bracket body having an interior facing side and an exterior facing side;

at least one aperture extending through a thickness of the bracket body from the interior facing side to the exterior facing side, and wherein the at least one aperture comprises a first aperture and a second aperture;

wherein the bracket body includes a recessed area spaced inward from the exterior facing side, wherein the first aperture and second aperture are located within the recessed area;

at least one insert received within the at least one aperture, wherein the at least one insert extends from a head portion on the exterior facing side to a tail portion on the interior facing side. and wherein the at least one insert comprises an internal passage open to both the head portion and the tail portion. wherein the internal passage is configured to receive a fastener;

a vehicle body structure having at least one opening aligned with the at least one aperture, wherein the tail portion is inserted through the at least one opening;

at least one attachment member securable to the tail portion to attach the bracket body to the vehicle body structure;

wherein the at least one insert comprises a first insert received in the first aperture and a second insert received within the second aperture, and wherein the at least one attachment member comprises a first attachment member secured to the tail portion of the first insert and a second attachment member secured to the tail portion of the second insert; and a cover enclosing the recessed area, wherein the cover is selectively removable to access the first insert and the second insert.

18. A method comprising:

providing a bracket body with a first aperture and a second aperture, wherein the bracket body has an interior facing side and an exterior facing side;

installing a first insert in the first aperture and a second insert in the second aperture, wherein each of the first insert and the second insert extends from a head portion on the exterior facing side to a tail portion on the interior facing side, and wherein each of the first insert and the second insert comprises an internal passage open to both the head portion and the tail portion;

securing a first attachment member to the tail portion of the first insert and a second attachment member to the tail portion of the second insert to fix the bracket body to a vehicle body structure along one edge of a glass panel; and installing a first fastener in the internal passage of the first insert and installing a second fastener in the internal passage of the second insert to secure a cross bar body to the vehicle body structure.

19. The method of claim 18, wherein the bracket body comprises a first bracket body, and including:

fixing the first bracket body to the vehicle body structure along the one edge of a glass panel;

fixing a second bracket body to the vehicle body structure along an opposite edge of the glass panel;

attaching one end of a cross bar body to the first bracket body; and attaching an opposite end of the cross bar body to the second bracket body.

20. The method of claim 18, including:

installing a cover over the first aperture and the second aperture;

selectively removing the cover to access the first aperture and second aperture; and the first fastener in the internal passage of the first insert and installing the second fastener in the internal passage of the second insert when the cover is removed.

* * * * *